US012561674B2

(12) United States Patent
Ramesha et al.

(10) Patent No.: US 12,561,674 B2
(45) Date of Patent: Feb. 24, 2026

(54) POST PAYMENT PROCESSING TOKENIZATION IN MERCHANT PAYMENT PROCESSING

(71) Applicant: Home Depot Product Authority, LLC, Atlanta, GA (US)

(72) Inventors: Apekshith Ramesha, Sugar Hill, GA (US); John Laffoon, Leander, TX (US); Stephen Pitts, Dallas, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 292 days.

(21) Appl. No.: 16/931,756

(22) Filed: Jul. 17, 2020

(65) Prior Publication Data

US 2022/0020002 A1     Jan. 20, 2022

(51) Int. Cl.
*G06Q 20/36* (2012.01)
*G06Q 20/08* (2012.01)
(Continued)

(52) U.S. Cl.
CPC ..... *G06Q 20/3674* (2013.01); *G06Q 20/0855* (2013.01); *G06Q 20/108* (2013.01);
(Continued)

(58) Field of Classification Search
CPC ........... G06Q 20/3674; G06Q 20/0855; G06Q 20/204; G06Q 20/401; G06Q 40/02; G06Q 20/108; G06Q 20/202; G06Q 20/34; G06Q 20/3672; G06Q 30/0185; G06Q 2220/00; G06Q 20/24; G06Q 20/14; G06Q 30/04; G06Q 40/12; G06Q 20/102; G06Q 20/02; G06Q 20/38215; G06Q 30/0238; G06Q 30/0268; G06Q 20/20; G06Q 20/40; G06Q 20/3821; G06Q 20/4012; G06Q 20/027; G06Q 20/3223; G06Q 40/00; G06Q 50/188; G06Q 50/265; G06Q 20/409; H04L 9/32; H04L 63/0428; H04L 2209/56;
(Continued)

(56) References Cited

U.S. PATENT DOCUMENTS 8,332,325 B2    12/2012    Faith et al.
9,633,342 B2    4/2017    Blackhurst et al.
(Continued)

OTHER PUBLICATIONS

Tokenization: https://searchsecurity.techtarget.com/definition/tokenization, 10 pgs.
(Continued)

*Primary Examiner* — Avia Salman
(74) *Attorney, Agent, or Firm* — Greenberg Traurig, LLP

(57) ABSTRACT

Systems and methods for payment processing include receiving, by a payment terminal, a personal account number to complete a payment. The personal account number is encrypted by the payment terminal. The encrypted personal account number is sent from the payment terminal to a merchant server via a network. The encrypted personal account number is sent from the merchant server to a tokenization service provider server for tokenization and validation via a payment processor. The merchant server receives an indication of whether the transaction was successful and a token from the tokenization service provider server.

12 Claims, 4 Drawing Sheets

(51) Int. Cl.

| | |
|---|---|
| *G06Q 20/10* | (2012.01) |
| *G06Q 20/20* | (2012.01) |
| *G06Q 20/34* | (2012.01) |
| *G06Q 20/40* | (2012.01) |
| *G06Q 30/018* | (2023.01) |
| *G06Q 40/02* | (2023.01) |
| *H04L 9/32* | (2006.01) |

(52) U.S. Cl.
CPC ......... *G06Q 20/202* (2013.01); *G06Q 20/204* (2013.01); *G06Q 20/34* (2013.01); *G06Q 20/3672* (2013.01); *G06Q 20/401* (2013.01); *G06Q 30/0185* (2013.01); *G06Q 40/02* (2013.01); *G06Q 2220/00* (2013.01); *H04L 9/32* (2013.01)

(58) Field of Classification Search
CPC ............... H04L 2209/76; H04L 9/0825; H04L 63/0485; H04L 9/3213; G07B 2017/00225; G07G 1/0009; G06F 21/34; G06F 21/606; G06F 21/62; G06F 2221/2107; G06F 2221/2141
USPC ........................................................... 705/66
See application file for complete search history.

(56) References Cited

U.S. PATENT DOCUMENTS

| | | | |
|---|---|---|---|
| 10,127,528 | B2 | 11/2018 | Solis |
| 10,134,031 | B2 | 11/2018 | Laracey |
| 10,460,311 | B2 | 10/2019 | Curtis |
| 2011/0307710 | A1 | 12/2011 | Mcguire et al. |
| 2014/0006127 | A1 | 1/2014 | DeCook et al. |
| 2016/0012465 | A1 | 1/2016 | Sharp |
| 2016/0117666 | A1 | 4/2016 | Davis et al. |
| 2016/0125417 | A1 | 5/2016 | Huang et al. |
| 2016/0381118 | A1 | 12/2016 | Andrews et al. |
| 2017/0068949 | A1 | 3/2017 | Brendell et al. |
| 2017/0076291 | A1* | 3/2017 | Cairns .................. G06Q 20/202 |
| 2017/0093809 | A1 | 3/2017 | Barnett et al. |
| 2017/0149739 | A1* | 5/2017 | Hull, IV ................ G06Q 20/00 |
| 2017/0293913 | A1* | 10/2017 | Gulak .................... G16H 10/40 |
| 2017/0330181 | A1 | 11/2017 | Ortiz |
| 2017/0357964 | A1 | 12/2017 | Subrahmanyam et al. |
| 2018/0036543 | A1 | 2/2018 | Delisle |
| 2018/0082284 | A1* | 3/2018 | Gomes ................. G06Q 20/405 |
| 2018/0082292 | A1 | 3/2018 | Chuang et al. |
| 2018/0247306 | A1* | 8/2018 | Dowty ................ G06Q 20/385 |
| 2018/0268405 | A1* | 9/2018 | Lopez .................. G06Q 20/227 |
| 2018/0293573 | A1 | 10/2018 | Ortiz et al. |
| 2018/0367510 | A1 | 12/2018 | Barnett et al. |
| 2019/0080332 | A1 | 3/2019 | MacKinnon |
| 2019/0156335 | A1 | 5/2019 | Safak et al. |
| 2019/0370892 | A1 | 12/2019 | Rampell et al. |
| 2019/0384896 | A1* | 12/2019 | Jones ...................... G06F 21/31 |
| 2020/0265422 | A1* | 8/2020 | Mokhasi ............. G06Q 20/354 |
| 2021/0142320 | A1* | 5/2021 | Cacioppo ............. G06Q 20/382 |

OTHER PUBLICATIONS

P2PE: https://www.bluefin.com/pci-validated-p2pe-faq/, 8 pgs.

Business Rules engine: https://martinfowler.com/bliki/RulesEngine.html, 3 pgs.

Forward Proxy: https://docs.trafficserver.apache.org/en/latest/adminguide/configuration/transparent-forward-proxying.en.html, 3 pgs.

Distributed architecture: https://keetmalin.wixsite.com/keetmalin/post/2017/09/27/distributedsystem-architectures-and-architectural-styles, 15 pgs.

ISA/US, Inter'l Search Report and Written Opinion issued in Appl. No. PCT/US21/41005, dated Oct. 19, 2021, 8 pgs.

\* cited by examiner

10

TOKENIZATION SERVICE
PROVIDER SERVER
16

FORWARD PROXY 22

TOKEN DATABASE 24

PAYMENT
TERMINAL
12

NETWORK
20

MERCHANT SERVER
14

PAYMENT
PROCESSOR
SERVER
18

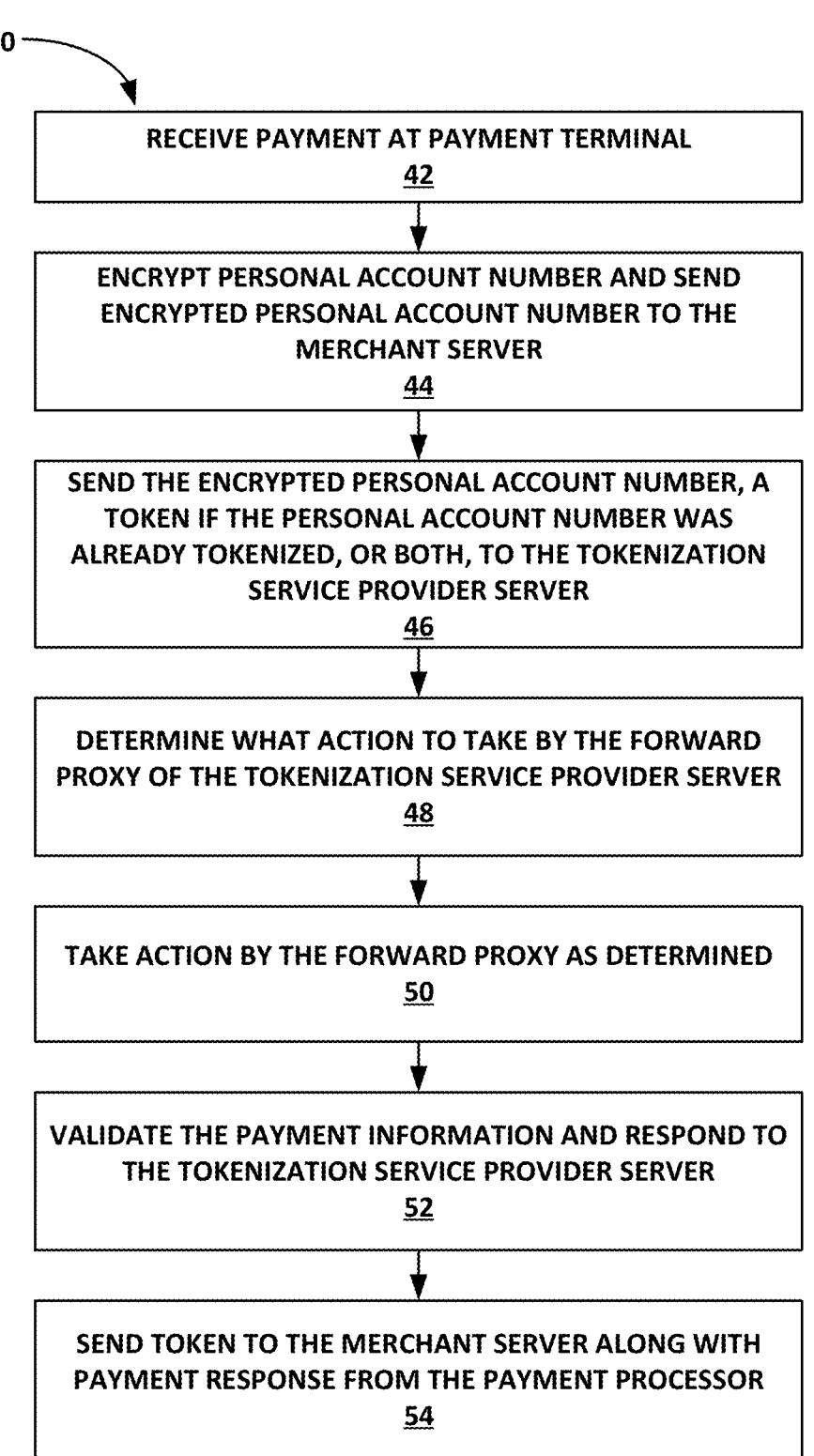

40

RECEIVE PAYMENT AT PAYMENT TERMINAL
42

ENCRYPT PERSONAL ACCOUNT NUMBER AND SEND
ENCRYPTED PERSONAL ACCOUNT NUMBER TO THE
MERCHANT SERVER
44

SEND THE ENCRYPTED PERSONAL ACCOUNT NUMBER, A
TOKEN IF THE PERSONAL ACCOUNT NUMBER WAS
ALREADY TOKENIZED, OR BOTH, TO THE TOKENIZATION
SERVICE PROVIDER SERVER
46

DETERMINE WHAT ACTION TO TAKE BY THE FORWARD
PROXY OF THE TOKENIZATION SERVICE PROVIDER SERVER
48

TAKE ACTION BY THE FORWARD PROXY AS DETERMINED
50

VALIDATE THE PAYMENT INFORMATION AND RESPOND TO
THE TOKENIZATION SERVICE PROVIDER SERVER
52

SEND TOKEN TO THE MERCHANT SERVER ALONG WITH
PAYMENT RESPONSE FROM THE PAYMENT PROCESSOR
54

FIG. 2

80
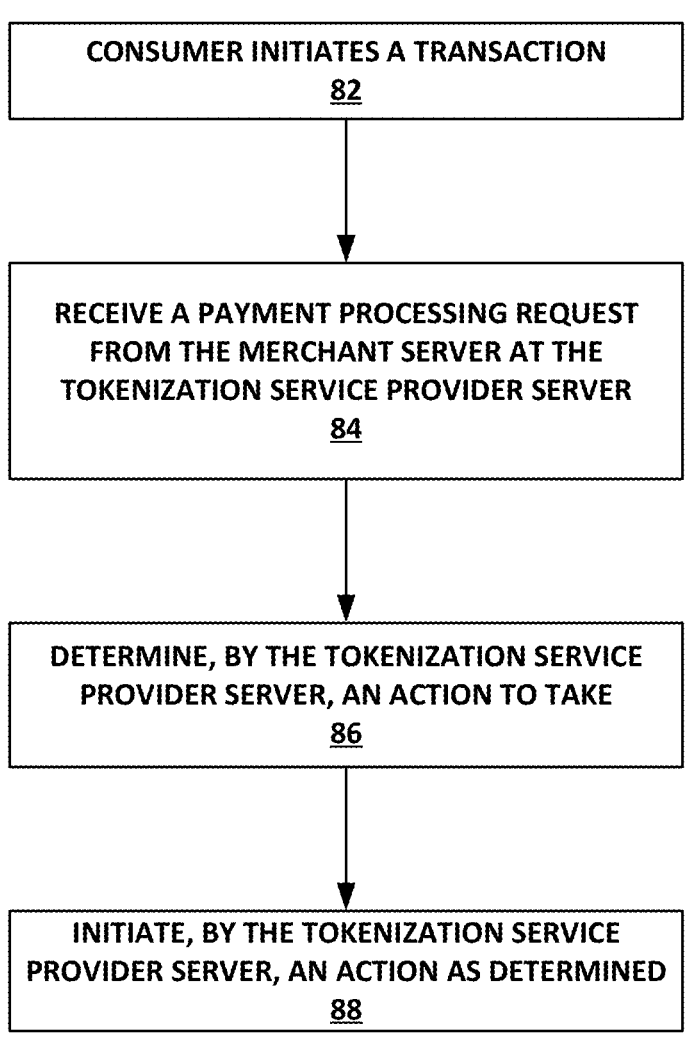
CONSUMER INITIATES A TRANSACTION
82
RECEIVE A PAYMENT PROCESSING REQUEST
FROM THE MERCHANT SERVER AT THE
TOKENIZATION SERVICE PROVIDER SERVER
84
DETERMINE, BY THE TOKENIZATION SERVICE
PROVIDER SERVER, AN ACTION TO TAKE
86
INITIATE, BY THE TOKENIZATION SERVICE
PROVIDER SERVER, AN ACTION AS DETERMINED
88
FIG. 3

POST PAYMENT PROCESSING TOKENIZATION IN MERCHANT PAYMENT PROCESSING

FIELD OF THE DISCLOSURE

This disclosure is generally directed to payment processing systems, including systems and methods for improved handling of sensitive payment information while processing a payment via a payment processing system.

BACKGROUND

Merchants can accept payments details of any type of tenders to process payments for a customer order. The payment process includes payment acceptance through a payment acceptance device (like a pin pad/card reader, website, or application). The payment transactions may then be routed to be processed through external payment processors.

SUMMARY

A method is disclosed that includes receiving, by a payment terminal, a personal account number to complete a payment. The personal account number is encrypted by the payment terminal. The encrypted personal account number is sent from the payment terminal to a merchant server via a network. The encrypted personal account number is sent from the merchant server to a tokenization service provider server for tokenization and validation via a payment processor. The merchant server receives an indication of whether the transaction was successful and a token from the tokenization service provider server.

Another method includes receiving, by a tokenization service provider server, a request for a payment transaction from a merchant server. The tokenization service provider server determines an action to take based on the payment transaction as received from the merchant server. The tokenization service provider server initiates the action as determined.

A system is disclosed that includes a payment terminal and a merchant server. The payment terminal is configured to receive a payment transaction. The payment terminal includes a processor and a memory. The processor receives a payment account number and encrypts the payment account number. The merchant server is configured to facilitate secure payment transactions and is in electronic communication with the payment terminal by a network. The merchant server includes a processor and a memory. The processor receives the payment account number as encrypted from the payment terminal. The processor sends the encrypted payment account number to a tokenization service provider server to complete the payment transaction. The processor receives a token from the tokenization service provider server once the payment transaction is complete.

BRIEF DESCRIPTION OF THE DRAWINGS

References are made to the accompanying drawings that form a part of this disclosure and illustrate embodiments in which the systems and methods described in this Specification can be practiced.

FIG. 2 is a flowchart of a method for conducting a payment transaction process, according to an embodiment.

FIG. 3 is a flowchart of a method for generating a digital token, according to an embodiment.

Like reference numbers represent like parts throughout.

DETAILED DESCRIPTION

Figure 1:
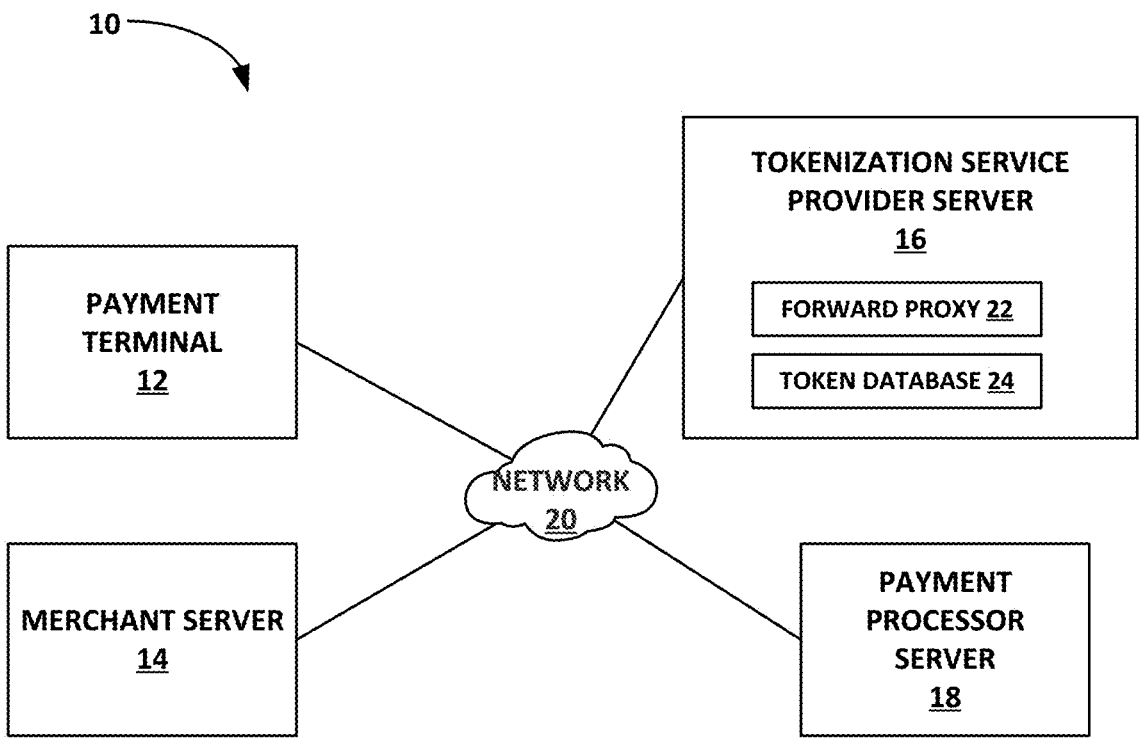
FIG. 1 is a diagrammatic view of an example payment processing system, according to an embodiment.

A merchant's (e.g., a retailer or the like) payment system that accepts credit/debit card payments contains Payment Card Industry (PCI) data that are highly sensitive. Because of the high sensitivity of the data, merchants undergo system-wide audits on a yearly basis to ensure that the PCI data is handled responsibly. The PCI Council enforces many controls. Configuration of the merchant payment systems is required to handle the PCI data. Failure to do so results in fines for every transaction processed by the merchant. Additionally, the PCI data poses a significant security risk for merchants. The PCI data has resulted in numerous data breaches (i.e., hacks) of the merchant's systems. Even with encryption and other security measures, there are several instances within the merchant's payment systems that can expose the PCI data in plain text, which poses a high risk to the merchant.

To stop external or internal threats going after these sensitive systems, the PCI data can be obfuscated through tokenization. "Tokenization," as used herein, is the process of replacing sensitive PCI data with unique identification symbols that are made of random numbers and characters and have no discernible mathematical pattern or algorithm (which is different from encryption).

Tokenization can be used when processing payments for purchases with a merchant (e.g., via a website, application, or point of sale (POS) terminal of the merchant). In known systems, the merchant may receive card information such as a personal account number (PAN) to complete a purchase with the merchant. Generally, a tokenization provider may provide a tokenization driver to the merchant so that the POS system can receive the PAN and then issue a token to be used for the payment process. In such a system, while the token reduces likelihood of the PAN or other sensitive information being stolen during a transaction, the merchant is still responsible for the point in the process in which the PAN is tokenized. Thus, the merchant must maintain the PAN and the token to complete the tokenization process. While the tokenization process reduces chances of the PAN being stolen, the merchant still ends up with card information on the merchant's payment processing system. This can pose a significant risk of data breach for a merchant.

Embodiments described herein relate to systems and methods in which sensitive payment information (e.g., PCI data such as PAN) is tokenized by a service provider that is external from the merchant. In an example system, a merchant would transmit a consumer's payment information to a tokenization service provider (TSP) server. The TSP server then forwards the payment information along to the payment processor and provides a token back to the merchant for storage in association with that user only after the transaction has been processed. That is, the token is not used for the current payment transaction.

When a consumer returns to shop again at the merchant, the consumer's payment information is already "stored" in the form of the previously-generated token. The TSP server can thus decrypt the token and forward payment information to payment processors in future transactions. This system enables the merchant to avoid storing sensitive payment information of consumers on the merchant's own servers. A malicious party would only find indecipherable tokens on the merchant's systems unless the malicious party were to also obtain the TSP's specific decryption capabilities.

The TSP server can include a "forward proxy" that can serve as a TSP selector, a TSP bypass, and even access separate services to perform checks like fraud detection prior to facilitating a transaction. The forward proxy can be configured to include a set of rules so that when information related to a transaction is received, the forward proxy may generate a new token for the consumer, validate an existing token, forward consumer information to a fraud checking service or entity, bypass the TSP and send a token directly to a payment processor, along with suitable combinations thereof.

The systems and methods described herein can advantageously ensure that a merchant cannot decrypt sensitive information within the merchant system and can still achieve tokenization and P2PE certification.

FIG. 1 is a diagrammatic view of an example payment processing system 10, according to an embodiment. The payment processing system 10 can generally be used by a merchant to conduct a secure transaction between a consumer and the merchant, including verifying an electronic payment method of the consumer with a payment processor.

The payment processing system 10 can be used to, for example, securely process a payment transaction. In an embodiment, the payment transaction can occur in a retail environment. In an embodiment, the retail environment can include, for example, one or more point-of-sale (POS) devices disposed in a store or other physical location of a merchant (e.g., brick and mortar location); a website that enables a user to browse, select, and purchase one or more items available for sale by the merchant; and/or an application that enables a user to browse, select, and purchase one or more items available for sale by the merchant. The system 10 is an example and can include one or more additional components in accordance with the disclosure herein. For example, the merchant server 14 can be connected in electronic communication with one or more databases or the like.

In the illustrated embodiment, the system 10 includes a payment terminal 12, a merchant server 14, a tokenization service provider (TSP) server 16, and a payment processor server 18 electronically communicable via a network 20.

The payment terminal 12 can be representative of a point-of-sale (POS) terminal that is physically disposed within a retail store, according to an embodiment. The payment terminal 12 can also be representative of a website or application through which the merchant enables purchases of goods by the consumer. The type of payment terminal 12 is not intended to be limiting, and generally can include any electronic device capable of accepting a card payment (e.g., a credit card, debit card, gift card, or other similar form of electronic payment) from a consumer to purchase good(s) from the merchant. The payment terminal 12 enables point-to-point encryption (P2PE) so that when card information is received, the personal account number (PAN) is encrypted. The data is encrypted as soon as a consumer's card is swiped. This can, for example, ensure that no raw data can be provided to the merchant server 14.

The merchant server 14 receives the encrypted PAN from the payment terminal 12. The merchant server 14, via the network 20, provides the encrypted PAN to the TSP server 16 for tokenization. In an embodiment, the merchant server 14 can first check whether the encrypted PAN is associated with a token that is already present on the merchant server 14. For example, if the encrypted PAN information from the payment terminal 12 has been used previously, then a token may be already stored on the merchant server 14. In such a situation, the merchant server 14 may pass along the token to the TSP server 16 instead of the encrypted PAN. In an embodiment, the merchant server 14 may provide the token and the encrypted PAN to the TSP server 16.

The merchant server 14 does not have a decryption key capable of decrypting the encrypted PAN data. The merchant server 14 is therefore incapable of decrypting the encrypted PAN. The decryption key is instead maintained on the TSP server 16. Thus, the configuration of the payment processing system 10, in which PAN data can only be decrypted remote from the merchant server, reduces risk of exposing unencrypted PAN in case of a breach of the merchant server 14.

Distinct from known methods, the merchant server 14 also does not receive any tokens from the TSP server 16 until after the payment has been validated by the payment processor server 18. As a result, the merchant server 14 has a reduced risk of exposing the encrypted PAN or other cardholder information in the case of a breach. Additionally, the merchant server 14 may become a less likely target for breaches because of the inability to decrypt the PAN or other cardholder information.

The TSP server 16 generally handles the issuance of tokens. The TSP server 16 is generally representative of a server or a collection of servers of the TSP. The TSP server 16 includes a decryption key to decrypt the encrypted PAN that is received from the merchant server 14. As a result, the TSP server 16 is responsible for securely storing cardholder information. In the illustrated embodiment, the TSP server 16 is separate from the payment terminal 12 and the merchant server 14, thereby reducing an amount of cardholder information that is available on the merchant server 14 and the payment terminal 12 of the payment processing system 10. Advantageously, this can reduce a risk of breach of sensitive data on the merchant side of the transaction. This can, for example, protect the merchant by reducing its possibility of exposing the cardholder information due to a breach of the merchant's systems.

The TSP server 16 includes a forward proxy 22 and a token database 24. Specifically, the forward proxy 22 can act as a TSP selector, a TSP bypass, and even access separate services to perform checks like fraud detection prior to facilitating a transaction. In an embodiment, the forward proxy 22 can be stored on the merchant server 14 instead of the TSP server 16.

The forward proxy 22 can receive inputs such as, but not limited to, contractual agreements (e.g., with the payment processor or the like); information about the card type (e.g., credit, debit, gift card, etc.; or card issuer such as financial institution); merchant type; suitable combinations thereof; or the like. The forward proxy 22 can output, for example, a request for the payment processor server 18 to process the authorization transaction.

When payment information is provided to the TSP server 16 from the merchant server 14, the forward proxy 22 receives the request. The forward proxy 22 can, accordingly, receive a token, encrypted PAN, or both a token and encrypted PAN. The forward proxy 22 may also receive one or more other pieces of information about the transaction being completed, according to an embodiment. In an embodiment, the merchant server 14 can also include data about the transaction such as, but not limited to, stock keeping units (SKUs) or other merchandise data involved in the transaction.

The forward proxy 22 can have a new token generated, according to an embodiment. For example, in an embodiment, the forward proxy 22 may have received encrypted PAN for a card payment that has not previously been processed by the TSP server 16. In an embodiment, the forward proxy 22 may receive a token and determine that the token has expired or is older than a threshold age for the token, or the like. In an embodiment, the forward proxy 22 may also generate a new token in response to the payment card having been misplaced or expired. In such a situation, the payment card information may have been updated.

In an embodiment, the forward proxy 22 can validate an existing token (e.g., compare the existing token to information in the token database 24).

In an embodiment, the forward proxy 22 can forward user information to a fraud checking service. For example, in an embodiment the forward proxy 22 can be configured to randomly select a payment request for validation via a fraud checking service. In an embodiment, the fraud checking may be based on whether the payment risk for fraudulent payments is placed on the merchant or the payment issuer. For example, when the payment risk is placed on the payment issuer, fraud checks may be conducted any time a transaction is processed by the forward proxy 22.

In an embodiment, the forward proxy 22 can bypass a TSP and send a token straight to the payment processor server 18. For example, instead of the forward proxy 22 receiving a token from the merchant server 14 and determining that the token received is valid, the forward proxy 22 could pass the token to the payment processor server 18 without validating. Generally, however, it is preferable for the token to be validated by the TSP server 16.

The token database 24 can store, for example, a decryption key for decrypting the encrypted PAN, an encryption key for encrypting the PAN according to the payment processor's requirements, unencrypted PAN information, or the like.

The payment processor server 18 can be a server or collection of servers associated with a financial service provider. Financial service providers can generally include an entity that provides financial products to consumers such as, but not limited to, a bank, a credit card issuer, or the like. The payment processor server 18 can be maintained by the financial service provider 18 to generate, maintain, store, provide, process, or combinations thereof, financial data associated with the financial product (e.g., credit/debit cards, gift cards, or the like). Financial data generally includes information about a financial account such as, but not limited to, card holder name, card holder address, account balance, available credit, card expiration dates, or the like. It is to be appreciated that this financial data is an example, and the actual financial data can vary beyond the stated list within the scope of this disclosure.

The payment processor server 18 can receive encrypted PAN data that is encrypted according to an encryption scheme for the payment processor. That is, the encrypted PAN can be different from the encrypted PAN sent from the merchant server 14 to the TSP server 16. The payment processor server 18 can accordingly store a decryption key capable of decrypting the encrypted PAN. During a transaction, the payment processor server 18 can, for example, validate financial payments to inform the merchant whether the payment is a valid and acceptable payment, providing a response via the TSP server 16 which is then tokenized and returned to the merchant server 14.

In an embodiment, the network 20 may be representative of the Internet. In an embodiment, the network 20 can include a local area network (LAN), a wide area network (WAN), a wireless network, a cellular data network, suitable combinations thereof, or the like. The network 20 may be referred to as communications network 20. In an embodiment, the network 20 can include a combination of wired and wireless connections, including using Wi-Fi, Bluetooth, or other similar wireless communication protocols. In an embodiment, the payment terminal 12, the merchant server 14, the TSP server 16 and the payment processing server 18 can transmit data via the network 20 through a cellular, 3G, 4G, or other wireless protocol. In some embodiments, the data can be transmitted via a wire line, an optical fiber cable, or the like.

FIG. 2 is a flowchart of a method 40 for conducting a payment transaction process, according to an embodiment. The method 40 can generally be performed using the payment processing system 10 (FIG. 1). The method 40 generally includes processing of a payment received from a consumer when making a purchase with a merchant, either through a retail store of the merchant (e.g., a POS device) or a website or application of the merchant.

At block 42, a payment is received by the merchant via the payment terminal 12. In an embodiment in which the payment terminal 12 is a POS device, this can include a credit card being swiped at the POS device. It is to be appreciated that when used herein, a "swipe" of a credit card does not require that a magnetic strip of the credit card be swiped. For example, a swipe can include any action which causes the credit card information to be read by the POS device. In an embodiment, these actions can include one or more of, a near field communication such as RFID or the like, a chip read via the payment terminal 12, or a sales associate manually entering the card number on a computing device of or associated with the payment terminal. In an embodiment in which the payment terminal 12 is a website or application, this can include a consumer entering card information into the website or application and submitting the card information for processing.

At block 44, the payment terminal 12 encrypts the PAN and sends the encrypted PAN to the merchant server 14.

At block 46, the merchant server 14 determines whether the encrypted PAN is already tokenized in the merchant server 14. For example, if the consumer has previously made a purchase with the merchant, the merchant server 14 may already have a token stored for the corresponding encrypted PAN. At block 46, the merchant server also sends the encrypted PAN, the token, or a combination including the encrypted PAN and the token to the TSP server 16.

At block 48, the forward proxy of the TSP server 16 determines whether to decrypt the encrypted PAN, validate an existing token (e.g., compare the existing token to information in the token database 24), forward user information to a fraud check service, bypass the TSP server 16 and send a token straight to the payment processor server 18, generate a new token, or suitable combinations thereof.

At block 50, if the forward proxy determined to decrypt the encrypted PAN, the TSP server 16 sends the PAN (as re-encrypted for the payment processor) to the payment processor server 18.

At block 52, the payment processor server 18 decrypts the re-encrypted PAN, validates the payment information, and sends a response (payment accepted, payment refused, etc.) back to the TSP server 16.

At block 54, once the payment verification is complete, the TSP server 16 generates a token and sends the generated token back to the merchant server 14 along with the payment response. In an embodiment, the TSP server 16, if having received a token from the merchant server 14, may send the previously generated token back to the merchant server 14. That is, the forward proxy 22 of the TSP server 16 can determine whether there is a need to issue a new token or whether the previously generated token is sufficient. The transaction is thus completed, and the token is stored on the merchant server 14 for reuse in future transactions.

FIG. 3 is a flowchart of a method 80 for generating a digital token, according to an embodiment. The method 80 is generally performed by the TSP server 16 (FIG. 1) during a transaction using the payment processing system 10.

At block 82, a consumer initiates a transaction. The transaction can be initiated by, for example, a consumer using the payment terminal 12.

At block 84, the TSP server 16 receives a payment processing request from the merchant server 14 at the forward proxy 22 of the TSP server 16.

At block 86, the forward proxy 22 of the TSP server 16 determines whether to decrypt the encrypted PAN, validate an existing token (e.g., compare the existing token to information in the token database 24), forward user information to a fraud check service, bypass the TSP server 16 and send a token straight to the payment processor server 18, generate a new token, or suitable combinations thereof.

At block 88, the forward proxy 22 of the TSP server 16 initiates an action. The action is based on the decision at block 86. For example, the action can include decrypting the encrypted PAN, validating an existing token, forwarding user information to a fraud check service, bypassing the TSP server 16 and sending a token straight to the payment processor server, generating a new token, or combinations thereof. The action at block 88 can include sending a token and a payment processing response to the merchant server 14.

Figure 4:
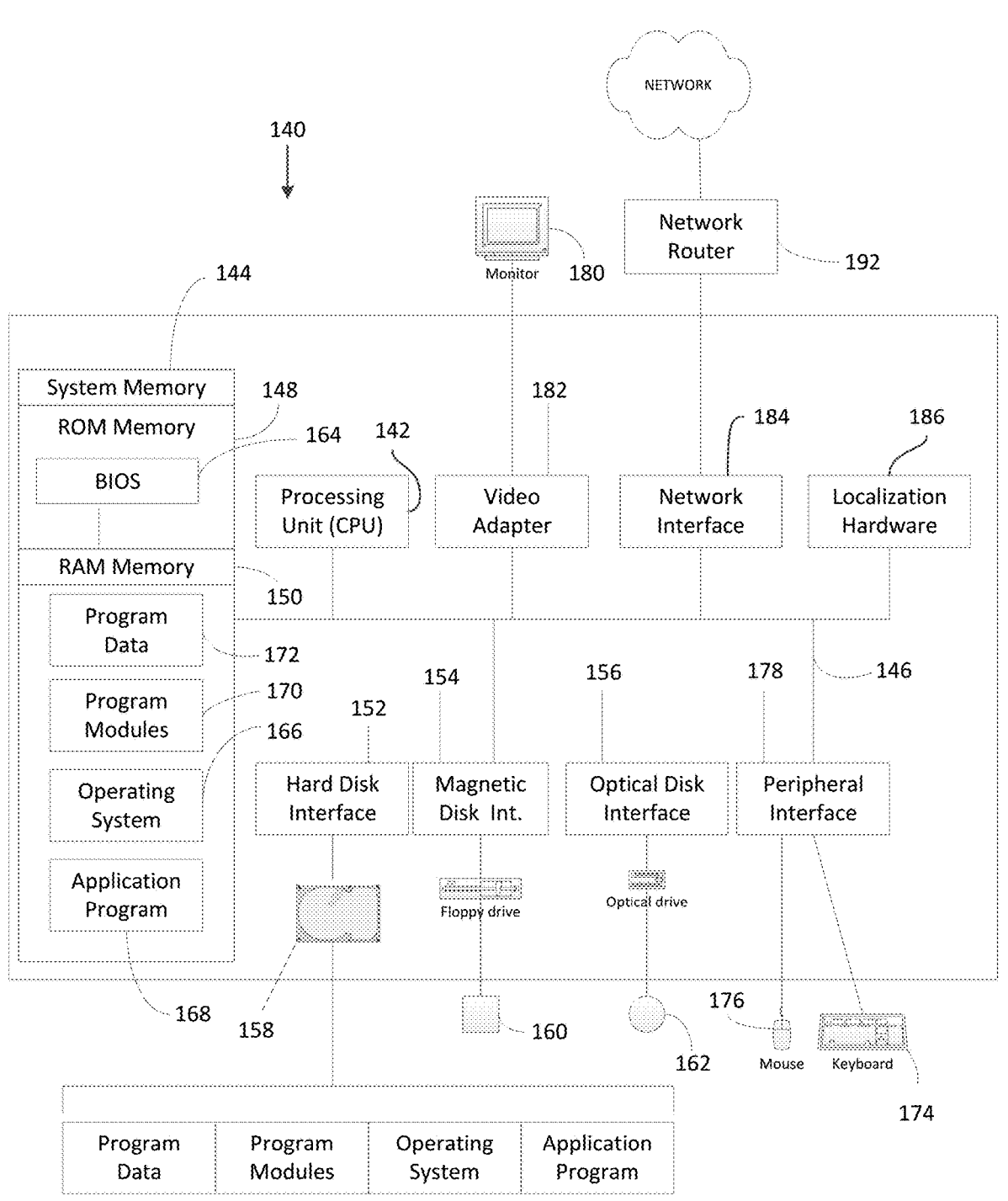
FIG. 4 is a diagrammatic view of an example user computing environment, according to an embodiment.

FIG. 4 is a diagrammatic view of an illustrative computing system that includes a general-purpose computing system environment 140, such as a desktop computer, laptop, smartphone, tablet, or any other such device having the ability to execute instructions, such as those stored within a non-transient, computer-readable medium. Furthermore, while described and illustrated in the context of a single computing system 140, those skilled in the art will also appreciate that the various tasks described hereinafter may be practiced in a distributed environment having multiple computing systems 140 linked via a local or wide-area network in which the executable instructions may be associated with and/or executed by one or more of multiple computing systems 140.

In its most basic configuration, computing system environment 140 typically includes at least one processing unit 142 and at least one memory 144, which may be linked via a bus 146. Depending on the exact configuration and type of computing system environment, memory 144 may be volatile (such as RAM 150), non-volatile (such as ROM 148, flash memory, etc.) or some combination of the two. Computing system environment 140 may have additional features and/or functionality. For example, computing system environment 140 may also include additional storage (removable and/or non-removable) including, but not limited to, magnetic or optical disks, tape drives and/or flash drives. Such additional memory devices may be made accessible to the computing system environment 140 by means of, for example, a hard disk drive interface 152, a magnetic disk drive interface 154, and/or an optical disk drive interface 156. As will be understood, these devices, which would be linked to the system bus 146, respectively, allow for reading from and writing to a hard disk 158, reading from or writing to a removable magnetic disk 160, and/or for reading from or writing to a removable optical disk 162, such as a CD/DVD ROM or other optical media. The drive interfaces and their associated computer-readable media allow for the nonvolatile storage of computer readable instructions, data structures, program modules and other data for the computing system environment 140. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 140.

Several program modules may be stored in one or more of the memory/media devices. For example, a basic input/output system (BIOS) 164, containing the basic routines that help to transfer information between elements within the computing system environment 140, such as during start-up, may be stored in ROM 148. Similarly, RAM 130, hard drive 158, and/or peripheral memory devices may be used to store computer executable instructions comprising an operating system 166, one or more applications programs 168 (such as the search engine or search result ranking system disclosed herein), other program modules 170, and/or program data 172. Still further, computer-executable instructions may be downloaded to the computing environment 160 as needed, for example, via a network connection.

An end-user may enter commands and information into the computing system environment 140 through input devices such as a keyboard 174 and/or a pointing device 176. While not illustrated, other input devices may include a microphone, a joystick, a game pad, a scanner, etc. These and other input devices would typically be connected to the processing unit 142 by means of a peripheral interface 178 which, in turn, would be coupled to bus 146. Input devices may be directly or indirectly connected to processor 142 via interfaces such as, for example, a parallel port, game port, firewire, or a universal serial bus (USB). To view information from the computing system environment 140, a monitor 180 or other type of display device may also be connected to bus 146 via an interface, such as via video adapter 182. In addition to the monitor 180, the computing system environment 140 may also include other peripheral output devices, not shown, such as speakers and printers.

The computing system environment 140 may also utilize logical connections to one or more computing system environments. Communications between the computing system environment 140 and the remote computing system environment may be exchanged via a further processing device, such a network router 192, that is responsible for network routing. Communications with the network router 192 may be performed via a network interface component 184. Thus, within such a networked environment, e.g., the Internet, World Wide Web, LAN, or other like type of wired or wireless network, it will be appreciated that program modules depicted relative to the computing system environment 140, or portions thereof, may be stored in the memory storage device(s) of the computing system environment 140.

The computing system environment 140 may also include localization hardware 186 for determining a location of the computing system environment 140. In embodiments, the localization hardware 186 may include, for example only, a GPS antenna, an RFID chip or reader, a Wi-Fi antenna, or other computing hardware that may be used to capture or transmit signals that may be used to determine the location of the computing system environment 140.

The computing environment 140, or portions thereof, may comprise one or more of the payment terminals 12, the merchant server 14, the TSP server 16, and the payment processing server 18 of FIG. 1, in embodiments.

The systems and methods described herein can advantageously ensure that a merchant cannot decrypt sensitive information within their payment system and still achieve tokenization and P2PE certification.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A computer-implemented method comprising:

receiving, by a first electronic device and from a second electronic device, a first request for verification, wherein the first request includes an encrypted identifier decryptable by a third electronic device, the encrypted identifier is based on an identifier associated with a user of the second electronic device, and the identifier represents a user account associated with a fourth electronic device;

forwarding, by the first electronic device and to the third electronic device, the encrypted identifier for verification;

receiving, by the first electronic device and from the third electronic device, a first token and a first indication of successful verification, wherein the first token is generated by the third electronic device and is stored on the first electronic device in association with the user for subsequent requests from the user;

providing, by the first electronic device and to the second electronic device, a first response to the first request, wherein the first response is based on the first indication of successful verification;

receiving, by the first electronic device and from the second electronic device, a second request for verification, wherein the second request does not include the encrypted identifier;

forwarding, by the first electronic device and to the third electronic device, the first token for verification;

receiving, by the first electronic device and from the third electronic device, a second token and a second indication of successful verification, wherein the second token is stored on the first electronic device in association with the user for subsequent requests from the user and replaces the first token; and providing, by the first electronic device and to the second electronic device, a second response to the second request, wherein the second response is based on the second indication of successful verification.

2. The computer-implemented method of claim 1, wherein the identifier is re-encrypted before being provided to the fourth electronic device for verifying the identifier.

3. The computer-implemented method of claim 1, wherein the encrypted identifier is not decryptable by the first electronic device.

4. The computer-implemented method of claim 1, wherein the first token is generated after successful verification of the identifier.

5. The computer-implemented method of claim 1, wherein the second electronic device is a point-of-sale electronic device.

6. The computer-implemented method of claim 1, wherein the encrypted identifier is encrypted by point-to-point encryption (P2PE).

7. The computer-implemented method of claim 1, wherein forwarding the encrypted identifier to the third electronic device further comprises the third electronic device decrypting the identifier, generating the first token associated with the identifier, and providing the identifier to the fourth electronic device for verifying the identifier with the user account.

8. The computer-implemented method of claim 1, wherein forwarding the first token to the third electronic device comprises the third electronic device obtaining the identifier corresponding to the first token, generating a second token associated with the identifier, and providing the identifier to the fourth electronic device for verifying the identifier with the user account.

9. A first electronic device, comprising:

a processor; and a memory storing instructions that, when executed by the processor, cause the first electronic device to perform a method comprising:

receiving, from a second electronic device, a first request for verification, wherein the first request includes an encrypted identifier decryptable by a third electronic device, the encrypted identifier is based on an identifier associated with a user of the second electronic device, and the identifier represents a user account associated with a fourth electronic device;

forwarding, to the third electronic device, the encrypted identifier for verification;

receiving, from the third electronic device, a first token and a first indication of successful verification, wherein the first token is generated by the third electronic device and is stored on the first electronic device in association with the user for subsequent requests from the user;

providing, to the second electronic device, a first response to the first request, wherein the first response is based on the first indication of successful verification;

receiving, from the second electronic device, a second request for verification, wherein the second request does not include the encrypted identifier;

forwarding, to the third electronic device, the first token for verification;

receiving, from the third electronic device, a second token and a second indication of successful verification, wherein the second token is stored on the first electronic device in association with the user for subsequent requests from the user and replaces the first token; and providing, to the second electronic device, a second response to the second request, wherein the second response is based on the second indication of successful verification.

10. The first electronic device of claim 9, wherein the identifier is re-encrypted before being provided to the fourth electronic device for verifying the identifier.

11. The first electronic device of claim 9, wherein forwarding the encrypted identifier to the third electronic device further comprises the third electronic device decrypting the identifier, generating the first token associated with the identifier, and providing the identifier to the fourth electronic device for verifying the identifier with the user account.

12. The first electronic device of claim 9, wherein forwarding the first token to the third electronic device comprises the third electronic device obtaining the identifier corresponding to the first token, generating a second token associated with the identifier, and providing the identifier to the fourth electronic device for verifying the identifier with the user account.

*  *  *  *  *